Patented Oct. 9, 1945

2,386,694

UNITED STATES PATENT OFFICE 2,386,694

CHEMICAL COMPOUND

Joy G. Lichty, Stow, Ohio, assignor to Wingfoot Corporation, Akron, Ohio, a corporation of Delaware No Drawing. Application July 5, 1944, Serial No. 543,603

2 Claims. (Cl. 260—486)

This invention relates to a new ester of alpha chloroacrylic acid derived by dehydrochlorination of the 2,3-dichloro-n-propyl alpha-beta-dichloropropionate. The new compound is known as 2,3-dichloro-n-propyl alpha-chloroacrylate and has the molecular structure

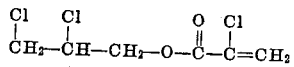

Although dehydrochlorinations of alpha, beta, dichloropropionic acid esters have been performed previously, the dichloropropyl ester has not been so treated. It would be expected that the dichloropropyl radical would also be dehydrochlorinated by the same reaction. I have discovered that 2,3-dichloropropyl alpha chloroacrylate can be prepared by heating 2,3-dichloropropyl alpha-beta-dichloropropionate in the presence of materials known to be dehydrochlorination catalysts, such as alumina, metal halides, alkali carbonates, clay or carbon. I have found that surprisingly good results can be obtained by the use of amino compounds, particularly tertiary amines. Accordingly, my preferred procedure involves the catalytic dehydrochlorination by heating at temperatures of 80 to 100° C. in the presence of compounds, such as N,N-dimethyl aniline, tributyl amine, triamylamine, pyridine and quinoline. The dehydrochlorination is preferably conducted in the presence of a polymerization inhibitor such as hydroquinone, pyrogallol, phenyl-beta-naphthylamine and N,N'-diphenyl-paraphenylene diamine to prevent the simultaneous polymerization of the product.

The new compound is valuable as a monomer in the preparation of synthetic resins by polymerization. Such reactions may be mass polymerizations conducted by heating in the presence of organic peroxides, such as benzoyl peroxide, to form transparent colorless solids. Mass copolymers may be prepared by reacting a mixture of the dichloropropyl chloroacrylate and one or more other monomers such as vinyl acetate, methyl methacrylate and vinyl chloride. Solvents, plasticizers, pigments or reinforcing agents may be added to suit.

The polymerization may also be conducted in aqueous suspension using an emulsifying agent, such as sodium oleate and an oxidant, such as sodium perborate. Such reactions which produce rubber-like polymers are usually induced at temperatures between 30 and 80° C. The latex so obtained is coagulated by methods known to the art and the polymer separated from the water and water soluble impurities. Emulsion copolymers of dichloropropyl alpha chloroacrylate and vinyl chloride, butadiene-1,3, styrene or vinylidene chloride may be prepared, preferably with less than 50% of the ester.

Further details of the preparation of the new chemical compound will be apparent in the following detailed description.

Example

Equal molecular proportions of 2,3-dichloropropanol-1 and alpha-beta-dichloropropionic acid were placed in a reaction flask with benzene and 0.5% of toluene sulphonic acid (based on the combined weight of the reactants). The mixture was refluxed for 10 hours. The water evolved during the reaction was condensed with the benzene and separated therefrom before the benzene was returned to the reaction vessel.

A mixture of 65.8 grams of the 2,3-dichloropropyl alpha-beta-dichloropropionate prepared as above described, 34.5 grams of dimethyl aniline and 6 grams of N,N'-diphenyl-para-phenylene diamine was heated on a steam bath at 90° C. for 1½ hours. The resulting product was washed with dilute hydrochloric acid and water and then distilled at 30 mm. pressure. The fraction boiling between 133 and 143° C. was identified as 2,3-dichloropropyl alpha-chloroacrylate having a density of $$D\frac{26}{15}$$

of 1.384 and an index of refraction ($N_D^{22}$) of 1.4920.

This application is a continuation-in-part of my application Serial No. 449,187 filed June 30, 1942.

Although the invention has been described with respect to a specific procedure, it is not intended that the details thereof shall be limitations on the scope of the invention, except as included in the following claims.

I claim:

1. As a new compound, 2,3-dichloropropyl alpha-chloroacrylate.

2. A method of preparing 2,3-dichloropropyl alpha-chloroacrylate which comprises heating 2,3-dichloro-n-propyl alpha-beta-dichloropropionate in the presence of tertiary amines.

JOY G. LICHTY.